United States Patent [19]

Lewit et al.

[11] Patent Number: 5,800,749
[45] Date of Patent: Sep. 1, 1998

[54] METHOD OF MAKING COMPOSITE STRUCTURES

[75] Inventors: Scott M. Lewit, Melabar; Neil Rohan, New Smyrna Beach, both of Fla.

[73] Assignee: Compsys, Inc., West Melbourne, Fla.

[21] Appl. No.: 651,621

[22] Filed: May 21, 1996

Related U.S. Application Data

[63] Continuation of Ser. No. 345,899, Nov. 28, 1994, abandoned, which is a continuation-in-part of Ser. No. 181,321, Jan. 14, 1994, Pat. No. 5,429,066.

[51] Int. Cl.⁶ .................... B29C 44/06; B29C 44/12
[52] U.S. Cl. ............... 264/46.4; 264/46.6; 264/258; 264/273; 425/812
[58] Field of Search ................. 264/46.4, 46.6, 264/257, 258, 273; 425/812

[56] References Cited

U.S. PATENT DOCUMENTS

| | | | |
|---|---|---|---|
| 2,648,619 | 8/1953 | Alderfer | 264/46.4 |
| 2,866,730 | 12/1958 | Potchen et al. | |
| 3,435,470 | 4/1969 | Krenzler | 156/79 |
| 3,567,565 | 3/1971 | Jones et al. | |
| 3,607,600 | 9/1971 | Schreter et al. | |
| 3,835,720 | 9/1974 | Fisher et al. | |
| 3,840,926 | 10/1974 | Stoeberl | |
| 3,848,284 | 11/1974 | Livingston | |
| 3,873,654 | 3/1975 | Smith | 264/46.4 |
| 3,989,781 | 11/1976 | Chant | 264/46.4 |
| 4,065,150 | 12/1977 | Van Auken | |
| 4,065,820 | 1/1978 | Starratt, Jr. | |
| 4,099,280 | 7/1978 | Hoppe et al. | |
| 4,205,408 | 6/1980 | Glass et al. | |
| 4,263,247 | 4/1981 | Berger et al. | |
| 4,323,406 | 4/1982 | Morello | 264/46.4 |
| 4,372,900 | 2/1983 | Doerfling | 264/46.4 |
| 4,412,687 | 11/1983 | Andre | |
| 4,510,200 | 4/1985 | Samowich | |
| 4,511,523 | 4/1985 | Hsu | 264/257 |
| 4,568,603 | 2/1986 | Oldham | |
| 4,681,798 | 7/1987 | Gill et al. | |
| 4,695,501 | 9/1987 | Robinson | |
| 4,764,238 | 8/1988 | Dastin et al. | |
| 4,800,114 | 1/1989 | Cichanowski | |
| 4,801,496 | 1/1989 | Buchacher | |
| 4,812,194 | 3/1989 | Pelz | |
| 4,851,283 | 7/1989 | Holtrop et al. | |
| 4,867,826 | 9/1989 | Wayte | 156/221 |
| 4,877,476 | 10/1989 | Wolf | |
| 4,891,176 | 1/1990 | Drysdale et al. | 264/250 |
| 4,942,075 | 7/1990 | Hartel et al. | |
| 4,954,377 | 9/1990 | Fischer et al. | |
| 4,988,469 | 1/1991 | Reavely et al. | 264/258 |
| 4,995,675 | 2/1991 | Tsai | |
| 5,068,001 | 11/1991 | Haussling | |
| 5,087,491 | 2/1992 | Barrett | |
| 5,098,346 | 3/1992 | Redmond | |
| 5,173,227 | 12/1992 | Ewen et al. | 264/46.4 |
| 5,227,227 | 7/1993 | Boulanger | |
| 5,230,844 | 7/1993 | Macaire et al. | |
| 5,250,132 | 10/1993 | Lapp et al. | |
| 5,258,585 | 11/1993 | Juriga | |
| 5,304,339 | 4/1994 | Le Comte | 264/258 |
| 5,308,675 | 5/1994 | Crane et al. | |
| 5,364,061 | 11/1994 | Ciolczyk et al. | |
| 5,413,661 | 5/1995 | Spengler et al. | 264/46.4 |
| 5,446,250 | 8/1995 | Oka | |

Primary Examiner—Allan R. Kuhns
Attorney, Agent, or Firm—Quarles & Brady

[57] ABSTRACT

A composite structure and method of making the composite structure are disclosed. A reinforcing fabric such as fiberglass is mechanically attached, for example, by stitching to a non-woven polyester fabric. The attached fabrics are placed in a mold with the non-woven fabric facing the inside of the mold. A self-expanding, self-curing foam is filled into the mold in an amount sufficient so that upon expansion in the closed mold, the foam penetrates into the interstices of the non-woven fabric which upon curing forms a bond therewith. The resulting structure can be used in a number of applications wherein the reinforcing fabric is later impregnated, for example, with a resin, and allowed to cure. Typical use of such a structure is as a stringer in fiberglass boat construction.

18 Claims, 7 Drawing Sheets

METHOD OF MAKING COMPOSITE STRUCTURES

CROSS REFERENCE TO RELATED APPLICATION

This is a continuation of application Ser. No. 08/345,899, filed Nov. 28, 1994 now abandoned, which is a continuation-in-part of Ser. No. 08/181,321, filed Jan. 14, 1994, now U.S. Pat. No. 5,429,066.

BACKGROUND OF THE INVENTION

This invention relates to a composite structure and method of making composite structures. More particularly, the invention relates to composite structures which are especially adapted for simplifying fabrication of a number of articles such as boats, ships, body parts for automobiles, trucks and the like. The composite structure in accordance with the invention is especially adapted for use in high-stress and hostile environment applications, and do not breakdown in such environments over periods of time.

In the past, a number of structural composite articles have been developed using a variety of different technologies. One prior art technique involves interweaving yarns of polyester fibers with yarns of glass fibers to form a composite fabric. The fabric is then fitted within a mold and soaked with resin. The formed fabric and resin composition is then allowed to harden within the mold. While providing a generally rigid structure, such a technique includes a number of limitations, among them the inability to produce a variety of different shapes of substantial bulk or complex dimensions.

Another prior art technique involves manufacturing a light weight energy-absorbing structure made up of a laminate including a plurality of fabrics. The fabrics are pre-impregnated with a thermosetting resin and abutted against a core of cellular foam which has had a bonding material applied at the interface between the impregnated fabric and the foam. Heat is applied to cure the resin and the bonding material. However, when bonding material is used, it is often the case in hostile environments that the bonding material breaks down, an undesirable result when such structures are used in high load or stress applications.

Yet still another prior art technique involves the manufacture of a thermoformable composite article comprised of a core layer made of a synthetic resin foam. A pair of adhesive layers are placed in contact with the opposite upper and lower surfaces of the core layer and a pair of fabric layers are superimposed on the opposite upper and lower surfaces of the core layer. The fabric layers are bonded to the core layer by the adhesive layers. At least one of the fabric layers is made of a non-woven fabric which has been impregnated with a thermoplastic or thermosetting resin. This technique also involves the disadvantages noted above with respect to the use of adhesives.

In boat building, especially glass fiber boats, hulls are typically reinforced by a grid arrangement of structural members known as "stringers" and "bulkheads," hereafter collectively referred to as "stringers." Present boat-building technology typically employs plywood stringers, although a small percentage uses glass fiber/foam stringers. The plywood stringer system involves several process stages. The plywood is first cut to shape by a cutter or by hand with the use of templates. The stringer system which is commonly made up of interlocking stringers and bulkheads is assembled outside of the boat, with interlocking pieces being held with staples. Once the system is assembled, it is then placed in a boat as a module and laminated into place using a combination of reinforcing fabrics.

Glass fiber stringers are installed in a slightly different manner from plywood stringers. One way of installing such stringers is to cut blocks of foam into the shape of the stringers. The stringer shaped foam is then bonded into the hull and covered with glass fiber. Another way is that the glass fiber shell of the stringer is first laminated using a male mold. The stringer is then ground to fit into the boat and once the stringer has been ground to fit, it is spaced off of the bottom of the boat to avoid cracking problems. The stringer is then laminated into place and holes are drilled into the stringer and the stringer is filled with a two-part urethane foam.

Future boat construction is expected to use closed molding technologies. The reason for this is 1) to control noxious vapor emissions into the environment, 2) to reduce labor costs and (3) to create structurally superior constructions. Such future technology will generally require use of stringer systems made of composite structures compatible with such closed moldings. Conventional stringer systems are not well suited to such technologies since they will need to be installed after the hull has been laminated using an open mold. Wood stringers would be difficult to incorporate into a closed mold due to height and width constraints. Further, prepositioning of glass fiber reinforcement normally hand laminated over the wood or foam stringer system would be costly and create quality control problems. Conventional glass fiber stringers also pose problems due to the void in the stringer structures. Specifically, since foam is injected into such stringer after installation, it becomes difficult to keep the resin from filling the inside of the stringer.

In accordance with the invention, these and other problems with the prior art are avoided by providing a composite structure and method of making such structure which avoids the use of adhesive and lends itself to a variety of shapes, structures and applications. In one specific aspect, the composite articles manufactured in accordance with the method are used as stringers and bulkheads in boat manufacturing technology greatly simplifying the manufacture of boats, and permitting their use in closed mold environments.

SUMMARY OF THE INVENTION

In accordance with one aspect of the invention there is provided a composite structure. The composite structure is made up of a reinforcing fabric layer. A non-woven fabric layer, such as a mat fiber layer, is attached to the reinforcing fabric layer. A structural foam is attached to the non-woven fabric layer on the side of the non-woven fabric layer opposite the reinforcing fabric, by filling the interstices (pores) of the non-woven fabric layer.

In a more specific aspect, the reinforcing fabric is preferably a directional reinforcing fabric composed of organic or inorganic fibers such as glass fiber, carbon fiber, an aramid fiber such as is commercially available from DuPont Corporation under the trade name Kevlar, a linear polyethylene or polypropylene fiber such as is commercially available from Allied-Signal, Inc. under the trade name Spectra, and polyester fibers. The reinforcing layer is made of directional or oriented reinforcing fiber fabric. An example of such fabrics includes a woven fabric similar to clothing fabric, but courser. Another example is a multi-layer stitched fabric. Such a fabric may have one layer oriented in one direction, e.g., 45°, a second layer in another direction, e.g., −45°, and a third layer in a third direction, e.g., 0°, with all layers stitched together.

In a more specific aspect, the reinforcing fabric is mechanically attached to the non-woven fabric, preferably by stitching, needle punching, or powder binder or adhesive. If adhesive or powder binder is used, it is recognized that it may breakdown eventually. However, when the article of the invention is used in a laminated environment, such as a stringer in a boat, the resin used to laminate the stringer into the boat will displace the adhesive or binder and take its place in holding the structures and fabrics together. The structural foam is a two-part, self-expanding, self-curing urethane foam which has been expanded and cured to attach itself to the non-woven fabric by having expanded into the interstices of the non-woven fabric. More specifically, the urethane foam is buoyant, with the non-woven fiber being a material such as is commercially available under the trade name Trevira Spunbond which is commercially available from Hoechst Celanese Corporation and is generally a non-woven fabric composed of continuous thermoplastic fiber, needle punched together to yield a felt-like fabric. In addition to fabrics such as Trevira Spunbond, other materials such as polyester staple mat, glass fiber mat, as well as other organic and inorganic fiber mats and fabrics can be employed. In a more specific aspect, the composite structure of the invention is shaped in the form of a stringer for use in boat construction.

In another aspect, the invention relates to a method of making a composite structure. The structure is made by the steps of attaching a reinforcing fabric layer to a non-woven fabric layer on one side thereof. The attached fabric layers are laid into a mold with the non-woven fabric layer facing the interior of the mold. The mold is then filled, at least partially, with a self-expanding, self-curable and at the time, uncured structural foam. The mold is preferably then closed and the foam is allowed to expand and cure to attach itself to the non-woven fabric layer by filling the interstices of the non-woven fabric layer to thereby result in the composite structure.

In an alternative embodiment of the method, the structure is made by the steps of attaching a reinforcing fabric layer to a non-woven fabric layer on one side thereof. The attached fabric layers are laid into a mold with the non-woven fabric layer facing the interior of the mold. A further piece of the attached fabric layers is placed on a mold lid which is then positioned to enclose the interior of the mold. The lid simultaneously seals the mold and positions the further piece of the attached fabric layers in the area enclosed by the lid. After the mold has been prepared in the above manner, it is filled at least partially with a self-expanding, self-curable and at the same time, uncured structural foam by means of a foam-dispensing system. The foam is allowed to expand and cure to attach itself to the non-woven fabric layer by filling the interstices of the non-woven fabric layer to thereby result in the composite layer.

In a more specific aspect, the foam-dispensing system includes separate tanks for holding the constituent materials which are used to form the self-expanding, self-curing urethane foam. The materials are forced under pressure through hoses and into a nozzle which mixes and dispenses the constituent materials as foam. In addition to mixing and dispensing, the foam system preferably incorporates a dispenser control valve which may be operated by a timing device to provide optional time variable control over the mass of foam which is dispensed. The importance of this feature is discussed below. The foam dispensed from the nozzle is forced into the interior of the mold through an injection port formed on one of the walls of the mold. In this embodiment, the attached fabric layers which are positioned on the portion of the mold incorporating the injection port, must be provided with an opening cut in the attached fabric layers before the mold is filled with foam. The opening in the fabric layers is provided to allow foam forced through the injection port to pass into the interior volume defined by the mold.

As an alternative to injecting the self-curable, self-expanding uncured structural foam into a closed mold through an injection port, the foam-dispensing system described above can also be used with an open-mold method for making a composite structure which shall now be described. In this embodiment, the structure is made by first attaching a reinforcing fabric layer to a non-woven fabric layer on one side thereof. The attached fabric layers are then laid into a mold with the non-woven fabric layer facing the interior of the mold. The mold is then filled at least partially, with the self-expanding, self-curable and at the same time uncured structural foam by means of the foam-dispensing system described above. The mold is preferably then closed and the foam is allowed to expand and cure to attach itself to the non-woven fabric layer to thereby result in the composite structure.

In a more specific aspect, the attaching step is conducted by mechanically attaching the reinforcing fabric layer to the non-woven fabric layer, in two cases by stitching or by needle punching. The reinforcing fabric layer is preferably a directional reinforcing fabric layer made up of woven or stitch bonded organic or inorganic structural reinforcing fiber such as glass fiber, carbon fiber, aramid fiber such as is available under the name Kevlar, linear polyethylene or polypropylene fiber such as is available under the name Spectra or polyester fiber. The non-woven fabric layer is of the type available under the name Trevira Spunbond, which is a non-woven polyester fabric, as well as other organic or inorganic fiber mat previously discussed.

With respect to the structural foam as applied in the method, it is preferably a self-expanding, self-curing urethane foam, and the method further includes the step of allowing the foam to partially expand before filling the foam into the mold. The mold is filled with an amount of foam effective to cause the foam to penetrate into the interstices of the non-woven fabric as it expands and to cure without penetrating into the reinforcing fabric layer. In order to avoid the foam penetrating into the reinforcing fabric layer, either the non-woven fabric is made of sufficient thickness to achieve this effect, or additional layers of non-woven fabric are laid on the layer of the non-woven fabric attached to the reinforcing fabric prior to adding the foam. In the latter case, the separate layer of non-woven fabric is of sufficient thickness to allow the foam to penetrate therethrough and into the layer of non-woven fabric attached to the reinforcing fabric layer, without penetrating into the reinforcing fabric layer.

Depth of foam penetration through the non-woven fabric layer is effected in part by the volume/mass of the self-expanding, self-curable foam placed in a particular mold. As explained above, the self-expanding characteristic of the foam causes it to penetrate into the interstices of the non-woven fabric as it expands. One factor which can cause excessive foam penetration through the non-woven fabric layer and undesirable penetration of foam into the reinforcing fabric layer, is the placement of an excess amount of foam within a mold of a given size. Conversely, when a mold is inadequately filled with foam, the expanding foam will not be sufficient to ensure proper penetration of the interstices in the non-woven fabric layer. This will result in a completed structure with undesirable decreased strength characteristics. Thus, it is desirable to control the amount of the expanding foam within the mold. This can be achieved by at least two methods as described below, which method may be used separately or in combination to control foam penetration.

One method for preventing excess foam from undesirably penetrating into the woven fabric layer is to incorporate overflow ports in the mold. Such overflow ports can function to permit excess foam to escape from the mold, thereby preventing the foam from penetrating through the nonwoven fabric and into the woven-fabric layer. If this method is used, an opening must be cut in the attached fabric layers in the area of the overflow port so that expanding foam may escape from the interior of the mold. In a preferred embodiment, if a foam-dispensing system is used to inject foam into a closed mold through an injection port, the injection port can also serve as the overflow port.

In a second method for preventing unwanted penetration of foam into the woven fabric layer, the mold is filled with a precisely controlled amount of foam by means of said foam-dispensing system. In a more specific aspect, the foam-dispensing system includes separate tanks for holding the constituent materials which are used to form the self-expanding, self-curing foam. The constituent materials are forced under pressure through hoses and into a nozzle which mixes and dispenses the constituent materials as foam. The nozzle includes one or more dispenser control valves which may be opened and closed by a timing device for precisely controlling the mass of foam which is dispensed at a given flow rate.

According to the method of the invention, any suitable system can be used which is capable of accurately controlling the mass of foam dispensed by the foam-dispensing system. In a preferred embodiment, the foam mass control timing device is electronically operated and can be pre-set to open a foam-dispensing valve for a predetermined period of time. The actual volume of foam dispensed during a given time period will vary depending upon the dispensing nozzle, foam pressure and other factors. Thus, the dispensing time to be controlled by means of the electronic timing device for a specific mold is preferably determined experimentally to obtain optimum penetration of the non-woven fabric layer in a particular application.

Electronically controlling the opening and closing of foam dispenser control valves for a predetermined duration as a means of controlling foam mass dispensed is one method for accurately controlling the mass of foam dispensed in a mold by a pressurized injection system. However, alternative systems which directly measure foam flow rates are also possible and the invention is not limited to time controlled systems. For example, untimed systems can be used where molds include properly designed overflow parts.

In yet another aspect of the invention, there is provided a method of manufacturing a boat. The method involves the steps of spraying a layer of gelcoat into a boat-hull mold and allowing the gelcoat layer to cure. As is well known to those of ordinary skill in the art, gelcoat is a filled polyester resin surface coat (paint) that protects the glass fiber of the hull from weathering. It also provides the cosmetic finish for the glass fiber boat hull. The gelcoat also includes pigments, ultraviolet (UV) stabilizers and fillers. It is not a glass fiber reinforced layer. A skin coat of glass fiber mat is laid on the gelcoat. Following cure of the skin coat, the structural layers are installed on the boat. Stringers are then laid throughout the mold in a reinforcing arrangement on top of the structural layers of glass fiber. The stringers are made as a composite structure as described previously in accordance with the invention.

The stringers also have flaps of the attached reinforcing fabric layer with or without the nonwoven fabric layer extending from the structure which are not attached to the foam. The stringers are laid so that the flaps lay on the structural layers of glass fiber. The structural layer of glass fiber and the stringers are impregnated with a curable resin and thereafter cured to result in a boat hull having the stringers attached thereto.

In this regard, it is noted that the stringers in accordance with the invention may be installed in three different manners. One method involves placing the stringers in a closed mold with other reinforcing fabric. Resin is then introduced to create the "fiber reinforced plastic" (FRP) structure. Another method requires placing the stringers on "wet," i.e., uncured resin, laminate in an open mold. The stringers are then wet out with resin and the hull and stringer laminates are allowed to cure together. Yet another method involves placing the stringers on a cured hull laminate in an open mold. The stringers are then wet out with resin which then cures to form the stringer laminate. Of the three methods, the first two produce stronger joints between the hull and stringer laminates since the resin in each cures together maximizing primary bonding. It also reduces molding time, thus allowing the mold to be cycled faster.

In one specific aspect, the coat of glass fiber is impregnated with resin and cured prior to laying the stringers therein. Thereafter, layers of chopped glass fiber are laid on the cured skin coat at the locations where the stringers are to be laid and the chopped glass fiber and stringers are then impregnated with resin. The impregnated stringers are laid on the layers of chopped glass fiber and the entire arrangement is cured.

BRIEF DESCRIPTION OF THE DRAWINGS

Having thus briefly described the invention, the same will become better understood from the following detailed discussion, read in conjunction with the drawings wherein.

DETAILED DISCUSSION OF THE INVENTION

Figure 1:
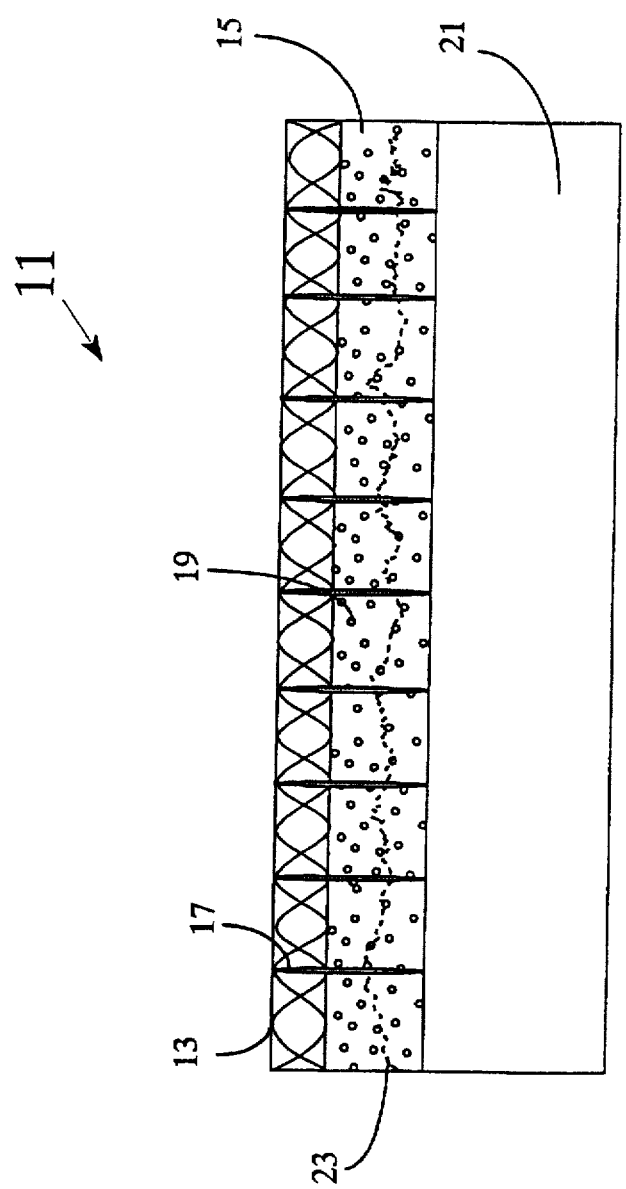
FIG. 1 is a partial, side cross-sectional view of a composite structure in accordance with the invention.

FIG. 1 illustrates a typical construction for a composite structure 11 in accordance with the invention. The structure 11 is made up of a reinforcing fiber layer 13, preferably a directional reinforcing fiber layer of organic or inorganic structural reinforcing fibers such as glass fiber, carbon fibers, aramid fibers such as is available under the name Kevlar, linear polyethylene or polypropylene fibers such as is available under the name Spectra, or polyester fibers. By reinforcing fiber is meant a fiber which when added to a composite material enhances the structural properties of the material. The fibers can be randomly oriented, or preferentially, they can be oriented in one or more directions. While a number of specific types of materials have been given for use as the reinforcing fiber layer, it will be appreciated by those of ordinary skill in the art that other equivalent-type reinforcing fiber layers can be employed in the practice of the invention.

The fiber layer 13 is attached to a non-woven fiber layer 15 which has a large number of interstices or pores 19. Preferably, the reinforcing fiber layer 13 and non-woven fiber layer 15 are secured to each other mechanically. Such mechanical attachment is typically done by conventional stitching 17. Other means of attachment, as noted previously, include alternatives such as needle punching, stapling or buttons. In the case of certain non-hostile environment applications even adhesives can be used as discussed previously.

A structural foam 21 is attached to the non-woven layer 15 by having penetrated into the interstices 19 at penetration region 23 of the foam 21 during the manufacture of the structure 11. Preferably the foam is a self-expanding, self-curing urethane foam which has been caused to expand at region 23 into the interstices 19 of non-woven layer 15 by having been filled into a mold in an amount sufficient to cause pressure as a result of expansion of the foam 21 to penetrate at region 23 into the interstices 19 of the non-woven layer 15.

The interaction between the foam 21 and non-woven layer 15 provides a number of mechanical advantages over other structures. More specifically, the low density urethane foams used in the practice of the invention typically have tensile strengths of about 50 pounds per square inch (psi) with an elongation of under 7%. When such a foam is expanded into a non-woven fabric, the mechanical properties of the fabric/foam system increases significantly. In the case where the fabric used is a continuous filament needle punched thermoplastic polyester fabric such as Trevira Spunbond, the mechanical properties of the Trevira/foam system increases to around 2,000 to 3,000 psi, with an elongation of over 20%. All of these non-woven fibers are typically non-woven organic or inorganic fiber mat, for example, polyester, fabrics of conventional construction.

Figure 2:
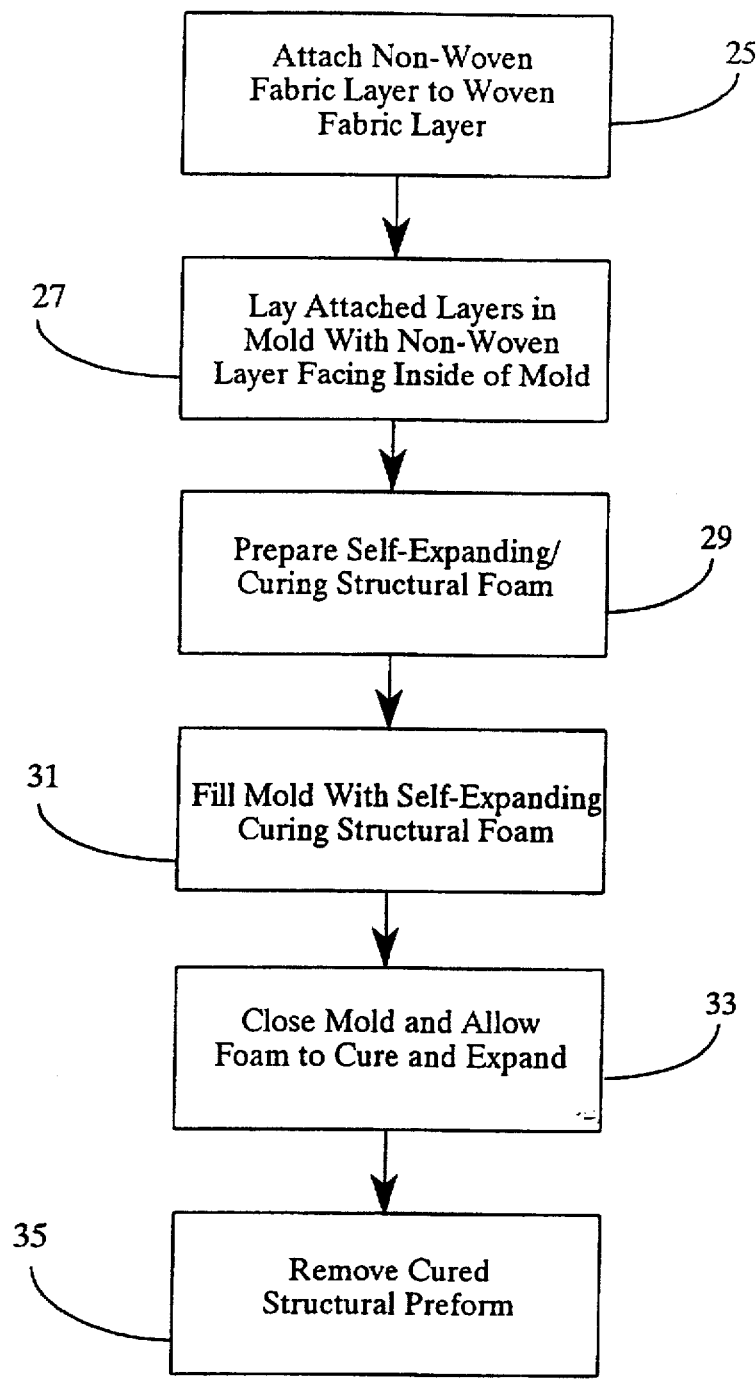
FIG. 2 is a block diagram showing the sequence of steps of making the composite structure in accordance with the method of the invention.

The method of making the composite structure in accordance with the invention is illustrated in FIG. 2. In a first step 25 the non-woven fabric layer 15 is attached to the reinforcing fabric layer 13. Preferably such attachment is done by stitching. Alternatively, as noted previously, the fabrics can be secured to each other by means of needle punching, staples or buttons or other mechanical technologies sufficient to secure one fabric to the other. After attaching the two layers of fabrics together, the attached layers are laid in a mold at a step 27 with the non-woven layer 15 facing the inside of the mold.

At step 29 a self-expanding, self-curing structural foam is prepared/mixed. Typically, such a self-rising, self-curing foam is a urethane foam commercially available from BASF, MOBAY, PPG and is typically an MDI-based rigid polyurethane foam (methylene-diphenyl-methane diisocyanate) using "hydrogenated chlorofluorocarbons" (HCFC), water and/or $CO_2$ as a blowing agent. The mold is then filled with the self-expanding and self-curing structural foam at step 31 in an amount sufficient to allow for expansion of the foam after the mold is closed. This generates enough pressure so that the foam penetrates into the interstices 19 of the non-woven fabric layer 15. On average, enough foam is added to generate pressures of about 5–18 "pounds per square inch" (psi), at a minimum 5 psi, and at an optimum pressure of 10 psi. Different mold pressure may be used, however, and upper pressure limits are dictated primarily by mold strength. For a given mold pressure, foam amounts and thickness of the non-woven layer can be adjusted so that mold completely fills with the foam, but the foam does not penetrate through the reinforcing layer. The mold is closed at step 33 and the foam is allowed to cure and expand therein. At step 35 the formed article is then removed after curing.

Figure 6:
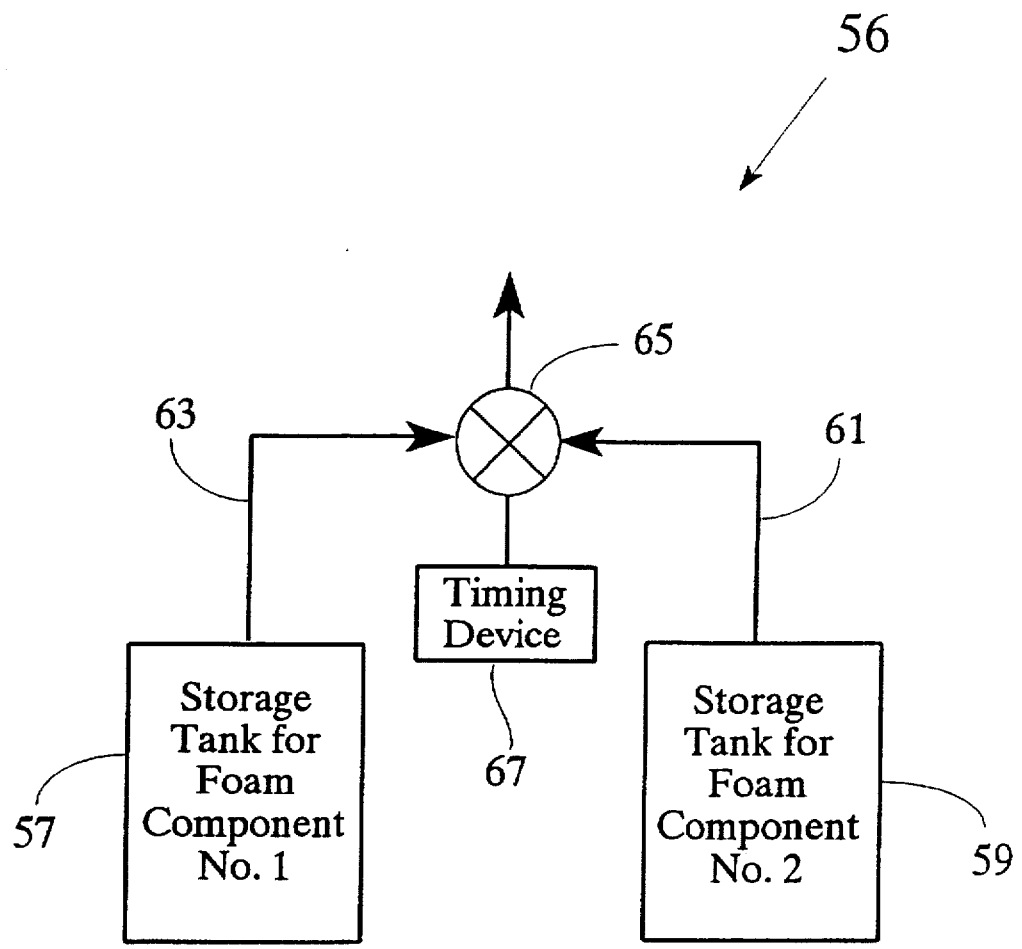
FIG. 6 is a block diagram showing a pressurized foam injection system having a time variable dispensing control system.
Figure 7:
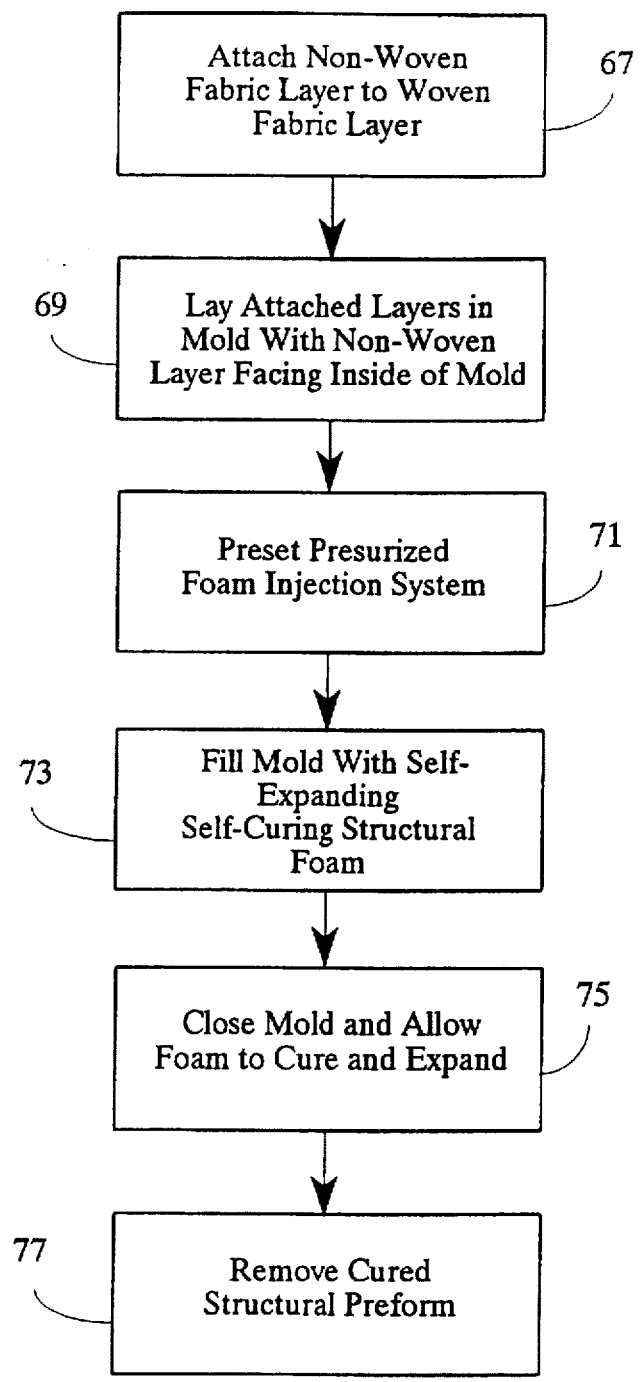
FIG. 7 is a block diagram showing a sequence of steps of making the composite structure in accordance with an alternative method of the invention.
Figure 8:
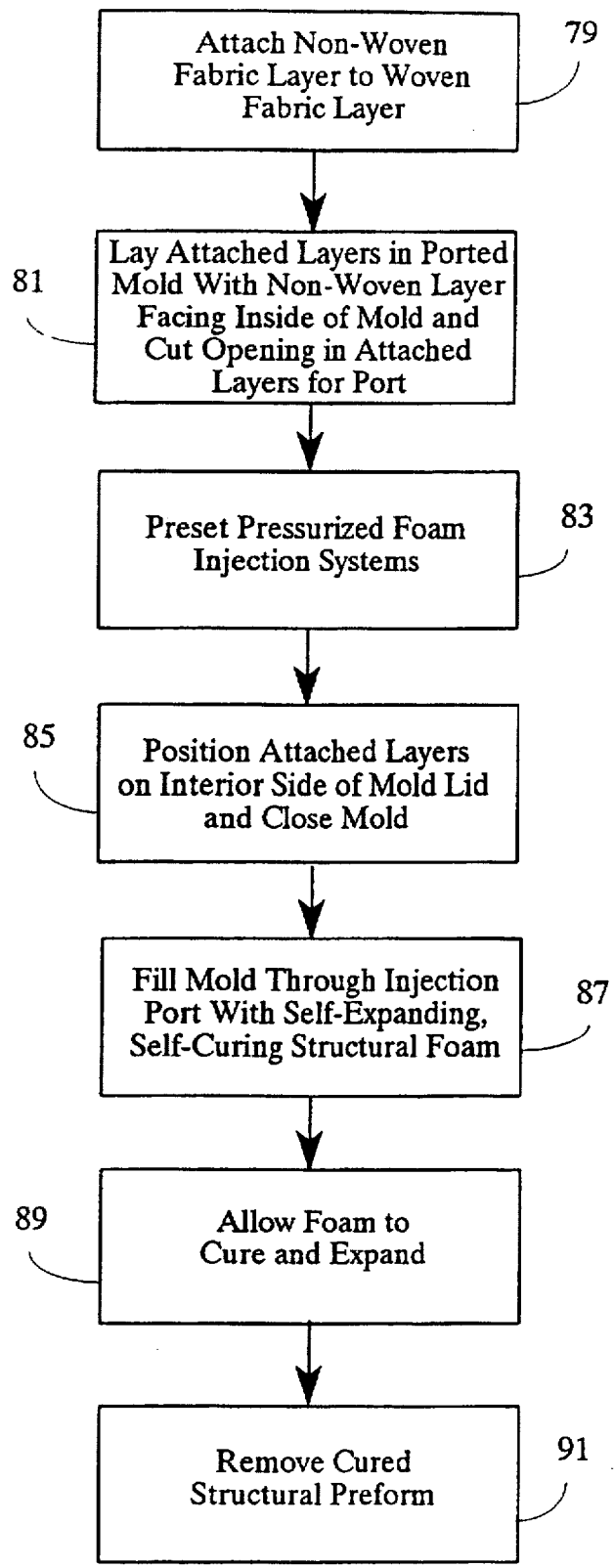
FIG. 8 is a block diagram showing a sequence of steps of making the composite structure in accordance with a second alternative method of the invention.

FIG. 6 shows a foam dispensing system for a two-part, self-expanding, self-curing foam which can be utilized for an alternative method according to the present invention as shown in FIGS. 7 and 8. The foam-dispensing system 56 includes storage tanks 57, 59 for separately storing the constituent materials which comprise the self-expanding, self-curing foam. The constituent foam materials are forced under pressure through hoses 61, 63 to nozzle 65. Nozzle 65 is provided for mixing the constituent materials necessary to form the self-expanding, self-curing foam, and dispensing said foam in a controlled manner. Nozzle 65 includes one or more valves to control dispensing of foam, which valves may be controlled by a timing device 67. Timing device 67 may be pre-set to cause the valves associated with nozzle 65 to open for a pre-determined duration, and thereby dispense a precisely-determined mass of self-expanding, self-curing foam.

An alternative method of making the composite structure in accordance with the present invention is illustrated in FIG. 7. In a first step 67, the non-woven fabric layer 15 is attached to the reinforcing fabric layer 13, as previously described. After attaching the two layers of fabric together, the attached layers are laid in a mold at a step 69 with the non-woven layer 15 facing the inside of the mold.

At step 71, the foam-dispensing system is prepared to dispense self-expanding, self-curing structural foam. In this step, timing device 67 is preset to open the valves in nozzle 65 for a predetermined dispensing time, so that the foam-dispensing system releases a predetermined mass of foam upon command. At step 73, the foam-dispensing system is caused to fill the mold with self-expanding, self-curing structural foam. If the timing device for the foam-dispensing system has been preset, the mold will be filled with a precise amount of foam corresponding to the dispensing time set on the timing device 67 in step 71. At step 75, the mold is closed and the foam allowed to cure and expand. Finally, at step 77, the formed article is removed after curing.

A second alternative method of making the composite structure in accordance with the invention is illustrated in FIG. 8. Steps 79, 81 and 83 in FIG. 8 are identical to steps 67, 69 and 71, respectively, in FIG. 71 except that the mold is provided with a foam injection port to allow foam into the interior of the mold. The foam injection port may be comprised of any suitable opening formed in a wall of the mold or a mechanical fitting capable of allowing the passage of foam into the mold. If the injection port is comprised of a simple opening, it is preferably located on an upper area of the mold, such as the mold lid, to prevent foam from escaping as the mold is filled. An opening is cut in the attached layers where they cover the injection port to allow the passage of foam through the attached layers.

At step 85, rather than filling an open mold with self-expanding foam, the attached fabric layers are positioned on the mold lid, so that the woven fabric layer faces the lid, and the non-woven layer faces inside of the mold when the lid is closed. After the lid has been closed in step 85, the foam-dispensing system is activated in step 87 so that self-expanding, self-curing structural foam is dispensed into the mold through the injection port. If the timing device for the foam-dispensing system has been pre-set, the mold will be filled with a precise amount of foam corresponding to the dispensing time set on the timing device 67. At step 89, the foam is allowed to cure and expand. Finally, at step 91, the cured structural pre-form is removed from the mold. With regard to the method of FIGS. 7 and 8, the precise mass of foam dispensed into the mold and the pre-set dispensing time set on the timing device for controlling said volume, are preferably determined experimentally to achieve penetration of said foam into the non-woven layer, but not into the woven layer of the attached fabric layers. The mold structure must be designed to withstand the pressure generated by the expanding foam. Typically, foam pressure may range from 5 to 18 psi.

In the method according to FIGS. 2, 7 and 8, one or more overflow ports can be provided on a portion of the mold to release excess foam, and limit foam pressure within the mold to a range of between 5 to 18 psi. The overflow port is preferably located on an upper area of the mold such as the mold lid. This placement prevents foam from escaping when the mold is initially filled, and permits foam to escape only after it has begun to expand. The overflow port can be comprised of a simple opening cut in a wall of the mold. Alternatively, a suitable fitting may be used which passes through a mold wall, and allows excess foam to escape the interior of the mold. If such overflow ports are used, a hole is cut in the attached fabric layers where they pass over the overflow port to allow the foam to escape the interior of the mold as it expands under pressure. In the method according to FIG. 8, the foam injection port can also serve as an overflow port. The size and number of the overflow ports are preferably determined experimentally to ensure that when excess foam has been added to a mold, the foam does not penetrate through the reinforced fabric layer.

The articles manufactured in accordance with the method of the invention can be molded in a variety of different shapes and applied in a number of different technologies. One specific application for the articles is in the boat building industry wherein the articles can be shaped as stringers to replace conventional wood stringers or glass fiber stringers used in the manufacture of glass fiber boats. The use of stringers in accordance with the practice of the invention results in a modular approach to boat manufacturing that saves the boat builder time and money, particularly for small boats. More specifically, conventional stringer systems take approximately six man hours to install. Stringers manufactured in accordance with the method of the invention require approximately twenty to forty man minutes to install on a cured hull. If the stringer system of the invention is installed and wet out with resin while the hull laminate resin is still "wet," i.e., uncured, molding time can also be significantly reduced. Thus, the process reduction results in substantial cost savings and decreased mold cycle times.

The stringers in accordance with the structure of the invention are especially adapted for use in boat construction. Typically, openmolded boat construction begins with a gelcoat being first sprayed into a mold. Once the gelcoat has cured, a skin coat consisting of chopped strand mat or chopped roving, woven roving or stitch bonded glass fiber is laid on the cured gelcoat layer. This will result in the structural layer of the boat. Typically, such a layer is then impregnated with a resin and allowed to cure to form the structural layer, and the stringers are laid therein after curing.

Figure 3:
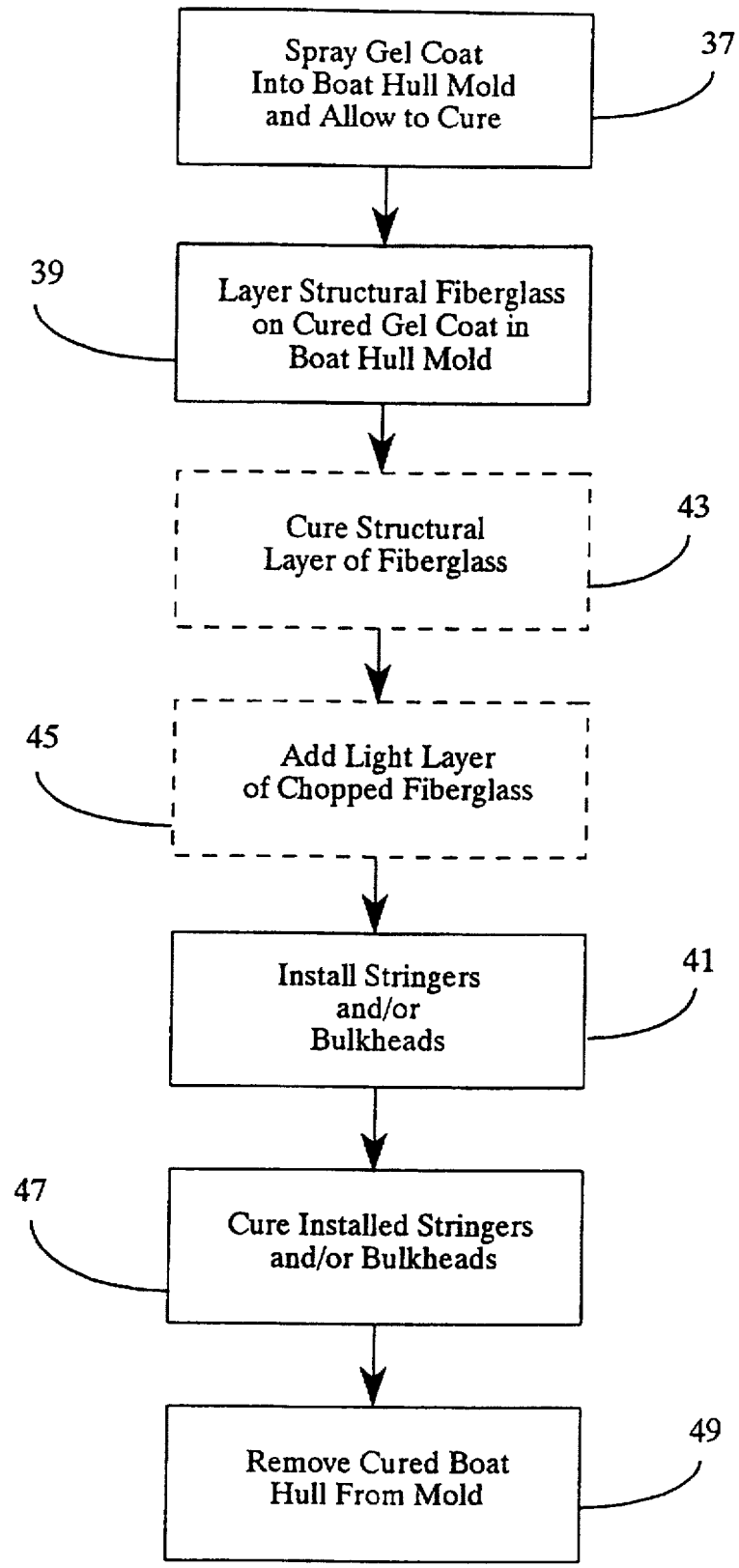
FIG. 3 is a block diagram showing a sequence of steps illustrating the method of manufacturing boats using the composite structure in accordance with the invention as stringers for the hull of the boat.

In accordance with the method of the invention as illustrated in FIG. 3, the gelcoat is first sprayed at step 37 into a boat-hull mold and allowed to cure. The structural glass fiber is layered at step 39 in the same manner as in conventional boat construction. In a preferred aspect, the stringers are then installed at step 41, preferably with the layer of structural glass fiber having been impregnated and the stringers having been impregnated with a setting resin. At step 47 the installed stringers are then cured along with the structural layer, and at step 49 the boat hull is then removed from the mold.

In an alternative implementation, the structural glass fiber is initially cured at a step 43 and thereafter at step 45 a light layer of chopped glass fiber is added at the locations where the stringers are to be installed. In this alternative, the light layer of chopped glass fiber is impregnated with resin and the stringers are impregnated with resin and then installed. The entire system is then allowed to cure. The process follows thereafter the same as with the initially described process with reference to FIG. 3.

Figure 4:
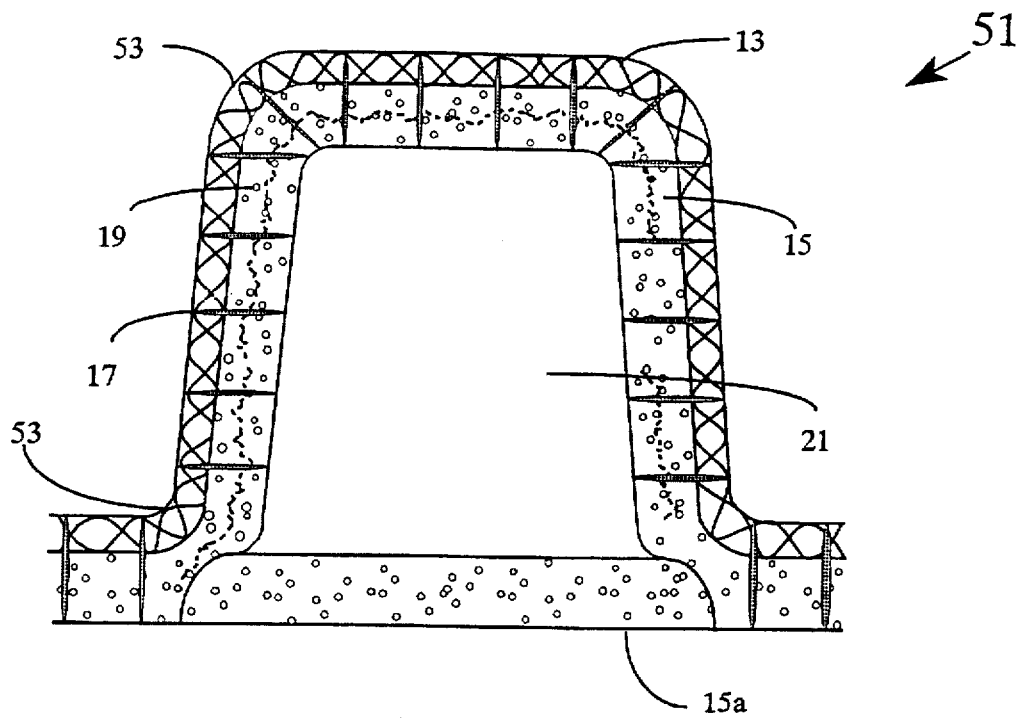
FIG. 4 is an end, cross-sectional view of a typical stringer construction made according to the method of the invention.

A number of advantages result in construction in accordance with the above-described system. First, as illustrated in FIG. 4, it will be appreciated that a stringer 51 in accordance with the structure of the invention can be made with rounded corners 53 which results in reduced stress on the cured glass fiber woven fiber 13 as implemented in use in boat construction because resin impregnated cured glass fiber generally weakens at sharp corners. The appropriate shape of a mold in making the structure 11 of the invention can avoid such sharp corners. Optionally, to provide increased strength and toughness to the urethane foam 21, an additional layer 15a of non-woven fiber can be attached to the lid of the mold to ensure that the fiber becomes secured to the foam at a region wherein the reinforcing fiber 15, i.e., glass fiber, is not required. As noted previously, the use of the non-woven fiber interfaced with the foam 21 provides increased structural properties.

Figure 5:
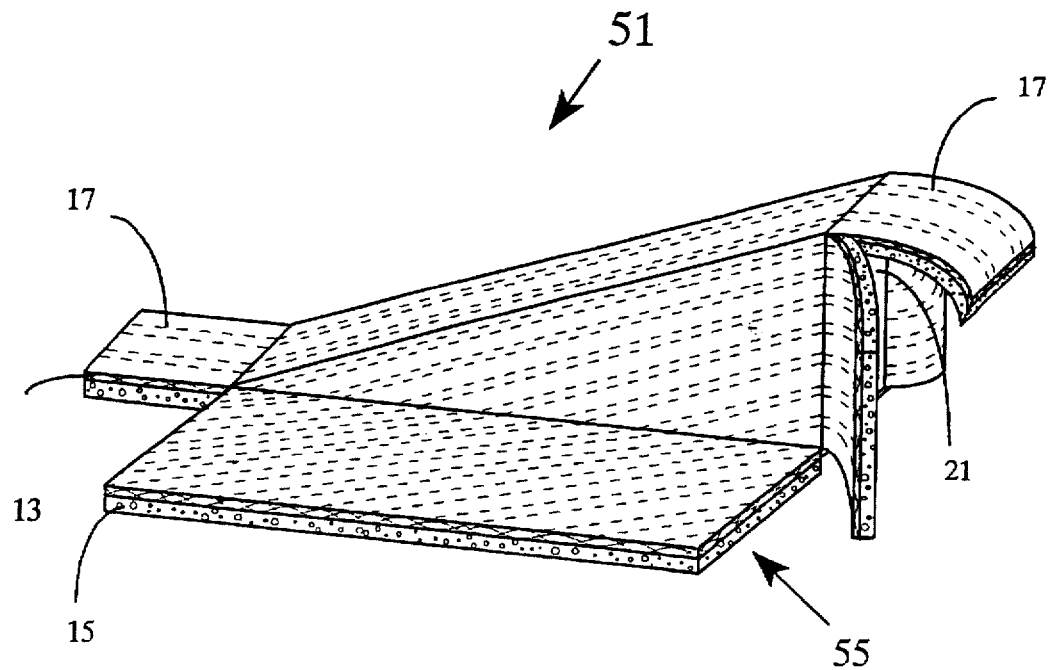
FIG. 5 is a perspective view of a stringer having been manufactured in accordance with the method of the invention.

A typical stringer 51 in accordance with the invention is better illustrated in FIG. 5. The stringer 51 includes a number of flaps 55 made up of secured non-woven fiber layer 15 and reinforcing structural fiber layer 13. Thus, in constructing the boat using the stringers of the invention, the stringers 51 with the reinforcing layer 13 facing upward, can be laid on the hull structure and the flaps 55 laid out over the structural glass fiber of the hull. The stringer 51 and the structural glass fiber of the hull are impregnated with resin, with the resin on the stringer 51 passing through reinforcing layer 13 and non-woven layer 15 to contact resin impregnating the hull glass fiber, and then cured. The flaps 53 then form a bond between the stringer 51 (at the bottom of the structure, and at the flaps) and the structural hull of the boat. As can be appreciated, a number of advantages result. One advantage is that a primary bond due to chemical interaction is formed between the flaps 55 and the glass fiber of the boat. This provides significantly enhanced strength to the boat hull as compared to conventional secondary bonding done through the conventional laminating when conventional wood or glass fiber stringer technology is used. A particular advantage is found in the use of the structures as stringers in that there is provided increased bonding area due to the flaps and underside of the stringers, as well as a high degree of flotation due to the urethane foam. This eliminates or minimizes the need for later injection of foam for flotation purposes as mandated by existing boat manufacturing standards.

While the invention has been described with reference to its use as stringers or bulkheads for boats, it will be appreciated by those of ordinary skill in the art that other uses can be made of the composite structures in accordance with the invention. For example, such structures can be used as reinforcing elements for automobile body parts such as hood and trunk lids, bumper beams and structural framing. Likewise, another use can be in architectural applications where the structures could be integrated into panel fabrication processes as structural ribs or stiffeners.

Although particular preferred embodiments of the invention have been disclosed in detail for illustrative purposes, it will be recognized that variations or modifications of the disclosed invention, including the use of additional layers of fabric, alternative types of self-expanding foam, and various alternative adhesive or synthetic resins, lie within the scope of the present invention.

What is claimed is:

1. A method of making a composite structure having an exposed reinforcing fabric layer free of structural foam and curable resin, said method comprising the steps of:

attaching a reinforcing fabric layer to a non-woven fabric layer on one side thereof;

arranging said attached fabric layers in a configuration constrained against outward movement and with the non-woven fabric layer facing inwardly and defining a cavity between opposing surfaces thereof;

dispensing a predetermined amount of a self-expanding, self-curable, uncured structural foam into said cavity, said foam expanding and curing in said cavity at a molding pressure determined by said predetermined amount of said foam and thereby attaching itself to said non-woven fabric layer to form said composite structure, said molding pressure causing said expanding foam to substantially fill only interstices of said non-woven fabric layer, without substantially penetrating the reinforcing fabric layer; and, freeing said cured composite structure from said constraint of said arranging step, said reinforcing fabric layer of said composite structure being thereafter substantially completely saturatable with a curable material for lamination to another structure in a subsequent processing step.

2. A method as in claim 1 wherein said attaching step is conducted by mechanically attaching said reinforcing fabric layer to said non-woven fabric layer.

3. A method as in claim 2 wherein said mechanical attaching is conducted by stitching.

4. A method as in claim 1 wherein said reinforcing fabric layer is a directional reinforcing fabric layer.

5. A method as in claim 1 wherein said reinforcing fabric layer is made from one of the group consisting of glass fiber, carbon fiber, aramid fiber, linear polyethylene or polypropylene fiber, and polyethylene fiber.

6. A method as in claim 1 wherein said reinforcing fabric layer is composed of organic or inorganic fibers.

7. A method as in claim 1 wherein said non-woven fabric layer is a non-woven fabric composed of continuous thermoplastic fiber needle punched together as a felt-like fiber mat.

8. A method as in claim 1 wherein said non-woven fabric layer is one of polyester staple mat, glass fiber mat, organic fiber mat and inorganic fiber mat.

9. A method as in claim 1 wherein said structural foam is a two-part, self-expanding, self-curing urethane foam, and said amount of foam is experimentally determined to be sufficient to cause said foam to penetrate into interstices of said non-woven fabric as it expands and cures without penetrating into said reinforcing fabric layer.

10. A method as in claim 1 wherein said non-woven fabric layer is of sufficient thickness to allow said foam to penetrate into interstices thereof without penetrating into said reinforcing fabric layer.

11. A method as in claim 1 further comprising the step of laying a separate layer of non-woven fabric on the layer of non-woven fabric attached to said reinforcing fabric layer prior to adding said foam to said cavity, with said separate layer of non-woven fabric being of sufficient thickness to allow said foam to penetrate therethrough and into the layer of non-woven fabric attached to said reinforcing fabric layer, without penetrating into said reinforcing fabric layer.

12. A method as in claim 1 further comprising the steps of positioning said attached fabric layers on a side of a cavity lid with the reinforced fabric layer facing said lid and enclosing said cavity with said lid, immediately prior to the step of filling said cavity with said amount of foam.

13. A method as in claim 1, wherein immediately after said cavity is filled with said amount of foam, a cavity lid with attached fabric layers positioned thereon facing the interior of said cavity is positioned to enclose said cavity.

14. A method as in claim 1 further comprising the step of providing overflow ports in said cavity and providing said attached fabric layers with openings in the areas of said cavity where said overflow ports are located, prior to filling said cavity with foam.

15. The method of claim 1, further comprising the step of laminating said cured composite structure to a larger composite structure by saturating said reinforcing fabric layer of said cured composite structure with a curable resin.

16. A method of making a composite structure, comprising the steps of:

attaching a reinforcing fabric layer to a non-woven fabric layer on one side thereof;

providing a mold for said composite structure having at least one port;

laying said attached fabric layers into said mold with the non-woven fabric layer facing the interior of the mold;

providing an opening in said attached fabric layers where the layers cover said port;

filling said mold with a self-expanding, self-curable, uncured structural foam; and allowing said foam to expand and cure to attach itself to said non-woven fabric layer by filling interstices of said non-woven fabric layer to thereby result in said composite structure, and allowing excess foam to escape through said port.

17. A method of making a composite structure specially configured for subsequent use as a structural element to be laminated into a larger structure comprised of composite materials, and having an exposed reinforcing fabric layer free of structural foam and curable resin, said method comprising the steps of:

attaching a reinforcing fabric layer to a non-woven fabric layer on one side thereof;

laying said attached fabric layers into a mold with the non-woven fabric layer facing the interior of the mold at least a portion of said reinforcing fabric layer being formed as a flap section to facilitate bonding of the composite structure into a larger structure;

predetermining an amount of foam for the mold to fill interstices of the non-woven fabric layer without penetrating through the reinforcing fabric layer;

pre-setting a dispensing device for a self-expanding self-curable, uncured structural foam to dispense said amount of said foam;

filling said mold with said amount of said foam; and allowing said foam to expand and cure to attach itself to said non-woven fabric layer by filling interstices of said non-woven fabric layer in a manner such that said foam does not penetrate into the reinforcing fabric layer, to thereby result in said composite structure; and wherein said reinforcing fabric layer of said composite structure is capable of being subsequently saturated with curable resin after said structural foam has been attached to said non-woven fabric layer and said composite structure has been removed from said mold.

18. The method according to claim 17 wherein said flap section is comprised of said non-woven fabric layer in addition to said reinforcing fabric layer.

* * * * *